Sept. 3, 1968  T. A. INSOLIO ET AL  3,399,586
GLASS CUTTING HEAD
Filed July 11, 1966  2 Sheets-Sheet 1

INVENTOR.
THOMAS A. INSOLIO
ROBERT P. DETORRE
BY
McCormick, Paulding & Huber
ATTORNEYS.

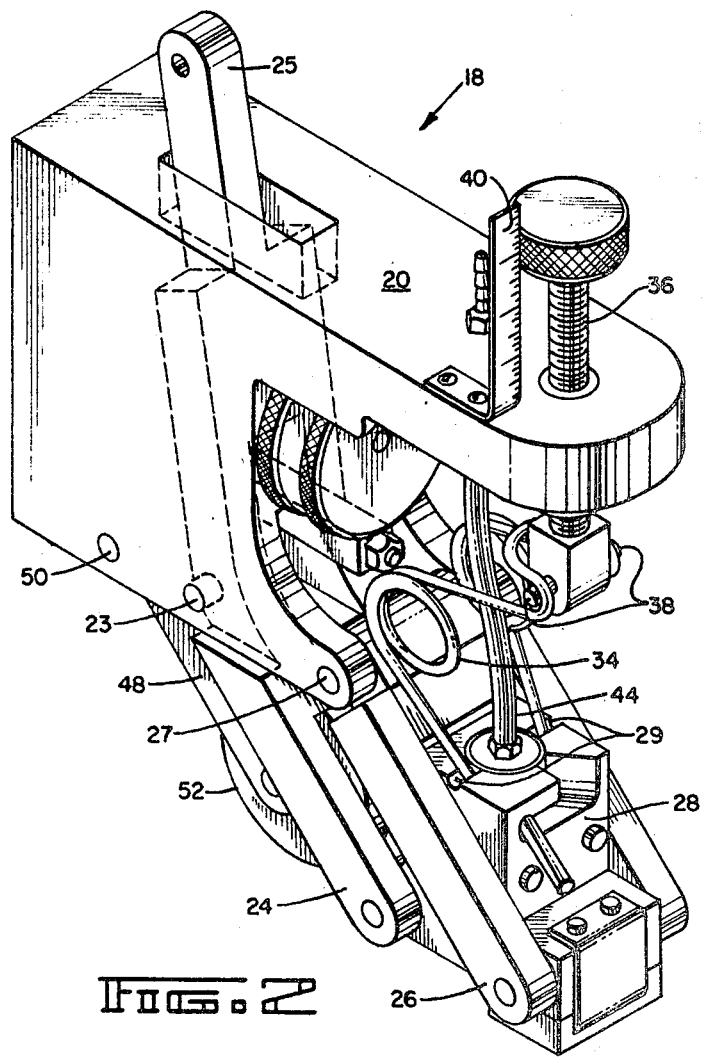

United States Patent Office 3,399,586
Patented Sept. 3, 1968

3,399,586
GLASS CUTTING HEAD
Thomas A. Insolio and Robert P. Detorre, Bristol, Conn., assignors to The Fletcher-Terry Company, Forestville, Conn., a corporation of Connecticut
Filed July 11, 1966, Ser. No. 564,299
9 Claims. (Cl. 83—8)

ABSTRACT OF THE DISCLOSURE

This invention comprises a cutting head of the type used with a glass cutting apparatus and includes a support body for a glass cutting wheel and a cutting wheel mounting block. A plurality of pairs of parallel levers are pivotally connected to the support body for rotative movement about spaced parallel axes. The mounting block is pivotally supported at the free ends of said levers which are rotatively secured thereto for movement about parallel axes spaced apart in the same relation as the first-mentioned axes so as to limit the levers to parallel movement only and the mounting block to arcuate movement. A jump-up wheel carried by the support body is operatively associated by suitable linkage with said lever to effect upward and rearward movement of the mounting block and cutting wheel upon engagement of the jump-up wheel with the leading edge of a glass sheet passing therebeneath.

---

This invention relates to apparatus for cutting glass, and deals more particularly with an improved cutting head for use in such apparatus.

The general object of the present invention is to provide an improved glass cutting head which substantially reduces or eliminates the adverse effects of abrupt engagement between the glass cutting means and a sheet of glass to be cut, the cutting means being so mounted as to eliminate or reduce the initial skipping or bouncing action characteristic of prior art cutting heads.

A more specific object of the present invention is to provide an improved glass cutting head in which the cutter wheel is so mounted that it is properly positioned for cutting by a novel linkage which also reduces the bouncing characteristic of prior art cutting heads.

Another specific object of the present invention is to provide an improved glass cutting head which permits the cutting force to be adjusted without interfering with the prepositioning, and anti-bounce cutter wheel mounting linkage.

The drawings show a preferred embodiment of the invention and such embodiment will be described, but it will be understood that various changes may be made from the construction disclosed, and that the drawings and description are not to be construed as defining or limiting the scope of the invention, the claims forming a part of this specification being relied upon for that purpose.

Of the drawings:

FIG. 2 is a perspective view of the cutting head shown in Fig. 1.

Figure 1:
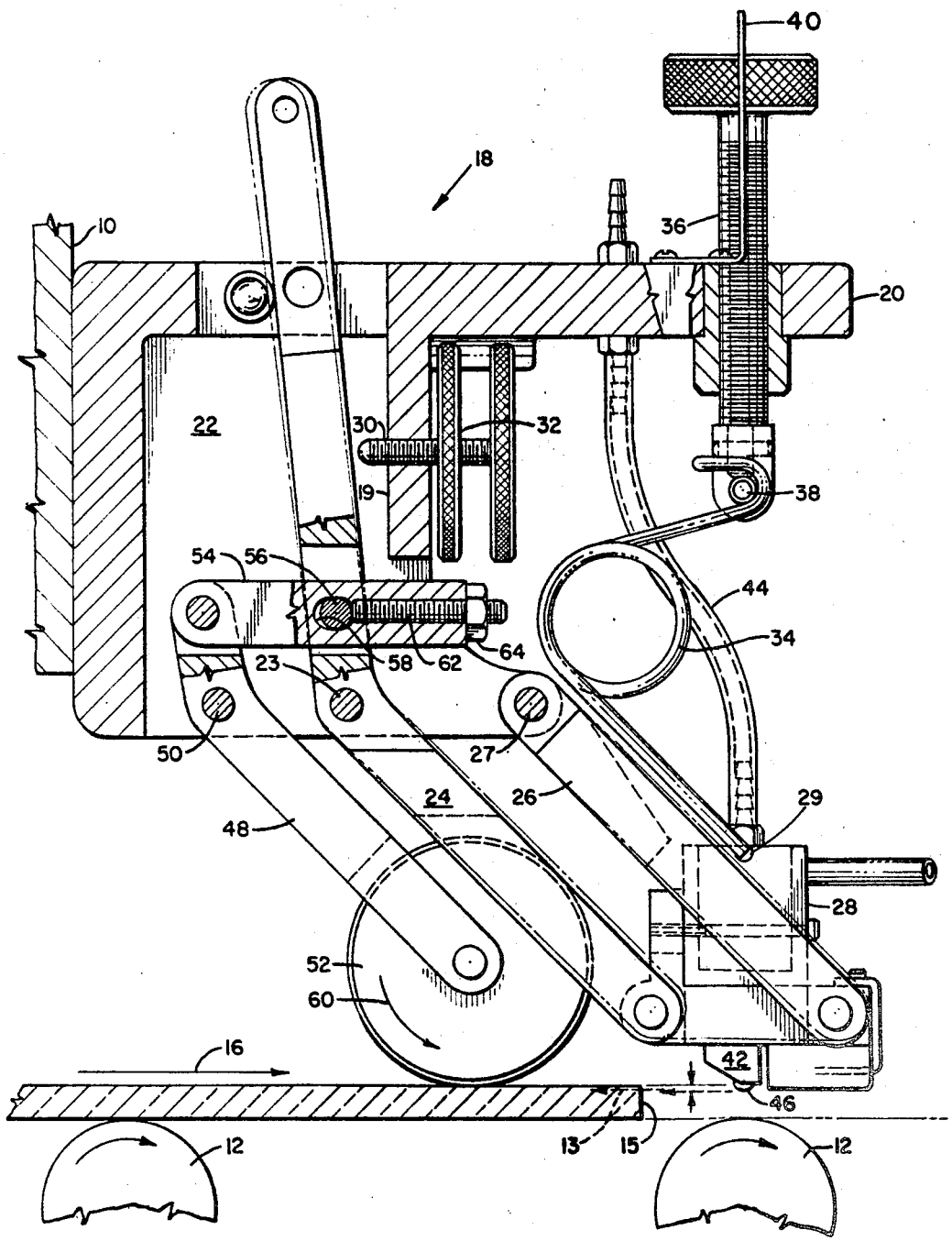
FIG. 1 is a sectional view through a cutter head of the present invention showing a movable portion thereof in an alternate position, and showing a portion of the glass cutting apparatus including the rollers for advancing a sheet of glass beneath the cutting head.

Turning now to the drawings in greater detail, FIG. 1 shows a cutting head of the present invention mounted upon the fixed portion of a glass cutting apparatus 10, and also showing suitably driven rollers 12, 12 for advancing a sheet of glass 14 to be cut in the direction of the arrow 16. It will, of course, be apparent that the cutting head itself might be moved relative to the glass and for purposes of the present invention, it is only necessary that a glass cutting apparatus be provided which is capable of achieving translational movement in at least one direction between the cutting head, to be described, and the glass sheet 14. It should also be noted that the cutting head might be so mounted as to score a vertically arranged sheet of glass instead of the horizontally oriented sheet shown.

The cutting head comprises a support body 18, which is adapted for attachment to the fixed frame of the apparatus 10 by suitable means (not shown). The support body 18 includes a depending web which is shown adjacent to the fixed frame 10 of the glass cutting apparatus so as to be conveniently attached thereto, and said body 18 also includes a forwardly projecting top portion 20 which is held in place by end plates 22, 22.

A pair of parallel levers 24 and 26 are pivotally carried at 23 and 27, respectively, by the end plates 22, 22 and a mounting block 28 is pivotally connected to the free ends of the levers 24 and 26 so as to form a parallelogram which restricts movement of the mounting block 28 to movement in an arcuate path wherein said block remains oriented at a particular angle with respect to a glass sheet to be cut in a manner to be described in greater detail hereinbelow.

Preferably, and as shown in FIG. 2, the lever 24 comprises one leg of bifurcated lower end portion of an elongated member which extends upwardly beyond the fixed pivot axis 23 of said lever so that an upper stem portion 25 extends through and protrudes above the top portion of the fixed support body 18. Preferably, and as shown in FIG. 1, the stem portion defines a detent which is releasably engageable with a spring loaded ball held in the body 18 to hold the levers and cutting means in a raised or inoperative position (not shown). The other leg of the bifurcated member, or lever 24, comprises a second lever which is also pivotally connected to the mounting block 28. Similarly, the lever 26 also comprises a bifurcated member with two spaced apart leg portions each of which is pivotally connected to a corner of the rectangularly shaped mounting block 28 as best shown in FIG. 2.

A stop screw 30 is threadably received in a depending portion 19 of the fixed support body 18, and a suitable lock nut 32 is provided thereon so that the stop screw 30 can be prepositioned to hold the parallel levers 24, and 26 in a rest position (not shown) wherein they are arranged at approximately a 45° angle with respect to to the direction of glass movement, indicated by the arrow 16. In accordance with the present invention, the levers 24 and 26 are preferably arranged at an angle in the range between 30° and 60° so that counterclockwise movement of the levers 24 and 26 away from the stop screw 30 causes the mounting block 28 to be moved in a direction which has both an upward component away from the glass and also a component in the direction of glass movement, indicated by the arrow 16.

Biasing means is provided for urging the mounting block 28 toward the glass 14 to be cut. Said biasing means comprises a pair of coiled torsion springs 34, 34, each having one of its legs engaging an abutment surface or groove 29 on the mounting block, as best shown in FIG. 2, and its other leg adjustably connected to the top portion of the support body 18 by a vertically arranged screw 36. Said screw 36 is threadably received in the top portion 20 and includes a suitable pin 38 for receiving an integral, common loop formed as shown, at the terminal end of said leg portions. As best shown in FIG. 2 a fixed vertical scale 40 is provided on the fixed support body so as to provide a measure of the force exerted by the spring 34 against the mounting block 28. The mounting block 28 is pivotally connected to the depending levers 24 and 26 as described above, but it is otherwise of conventional construction and carries a glass cutting means indicated generally at 42 which is preferably fitted with a suitable lubricating line 44 so as to provide cutting fluid to a cutter wheel 46 rotatably supported at the lower end of the cutting means 42 for rotation in a plane perpendicular to the glass sheet as best shown in FIG. 1. As shown, the cutting means 42 is of a readily removable variety being locked in the mounting block 28 by a bayonet type connection, the details of which need not be described in detail herein.

In further accordance with the present invention, a third lever 48 is pivotally connected to the fixed support body 18 for movement about an associated fixed axis 50 which, as seen in FIG. 1, is spaced to the left of the lever axes 23 and 27 of the levers 24 and 26, respectively. The lever 48 carries a jump-up, or guide wheel 52, at its lower end, while the upper portion of the lever 48 defines a crank arm which is pivotally connected, by a link 54, to the upstanding stem portion 25 of the lever 24. It should be noted that the jump-up wheel 52 is thus rotatably mounted ahead of the cutting means 46 in the direction of glass movement so that as the glass 14 advances in the direction of the arrow 16 it is engaged by the jump-up wheel 52 well before contacting the cutting wheel 46, as best shown in FIG. 1.

Suitable means is provided for connecting the link 54 to the upstanding stem portion 25 of the lever 24. Preferably, said means includes a stud 56 which is fixed to the stem portion 25 and slides in an elongated slot 58 defined for this purpose in the link 54.

As so constructed and arranged, engagement of the jump-up wheel 52 with the leading edge 15 of the glass sheet 14 causes an upward movement of both the jump-up wheel 52 and the mounting block 28. After some preliminary bouncing motion, the jump-up wheel 52 will be positioned on top of the glass sheet as shown in FIG. 1 and will be rotated thereby in the direction of the arrow 60. It is noted that in this position the cutter wheel 46 will be quite accurately located in an optimum position for initiating cutting or scoring of the glass sheet when said wheel contacts the glass sheet. As indicated by the dotted line in FIG. 1, the cutter wheel 46 will remain at the height shown until it contacts the glass sheet at which time the upward force of the glass sheet on the cutter wheel will lift the latter slightly against the bias of the spring 34. It is further noted that once the cutter wheel 46 reaches its scoring position on the glass sheet 14, the lever 24 will be rotated slightly, as indicated by the broken lines of FIG. 1, so that the stud 56 is moved toward the left relative to the elongated slot 58 in the link 54, causing a degree of free play between the jump-up wheel 52 and the cutter wheel 46. In this manner, the jump-up wheel 52 has little or no effect upon the vertical position of the cutter wheel 46 relative to the glass sheet as soon as the wheel 46 has begun to score the glass. Therefore, variations in glass thickness and undulations or waviness due to the rollers 12, 12 which effect vertical movements of the jump-up wheel 52 are not transmitted to the cutter wheel 46, at least not the minor movements which are normally encountered.

In further accordance with the present invention suitable means is provided for adjusting the relative displacement between the cutting wheel 46 and the jump-up wheel 52 so that the preliminary position of the cutter wheel relative to the glass sheet can be accurately controlled prior to commencing of this scoring operation to position it in an optimum position for engagement with the glass sheet. Preferably, and as shown, said means comprises a stop screw 62 which is threadably received endwise in the link 54 and serves to increase or decrease the length of the slot 58. A stop nut 64 is provided for locking the stop screw 62 in any predetermined position.

It is also noted that the stop screw 62 is effective to vary the degree of freedom of relative vertical movement between the jump-up wheel 52 and the cutting wheel 46.

While the operation of the above-described device has been described hereinabove with reference to the description of its various parts, a brief summary of its operation will now be presented. Initially, the glass sheet 14 is fed to the right as in FIG. 1 by rollers 12, 12 in a transverse direction indicated generally by the arrow 16 of that figure, its leading edge 15 being high enough to engage the jump-up wheel 52 which prior to engagement by the glass sheet will be disposed in a somewhat lower position than that shown in FIG. 1. Engagement between the leading edge 15 and the jump-up wheel 52 causes a counterclockwise rotation of the levers 48, 24 and 26 about their respective axes, the amplitude of which is determined by the inertia of these various parts, the speed of the glass sheet, and the force exerted by the coil torsion spring 34. In any event, and prior to the instant of time at which the leading edge 15 engages the cutter wheel 46, the jump-up wheel 52 will have reached a rest position on top of the glass sheet 14 as shown in FIG. 1, and the trailing cutter wheel 46 will be prepositioned in an optimum position as shown. The exact vertical displacement between the jump-up wheel 52 and the cutter wheel 46 is determined by the setting of the set screw 62 as described. As mentioned hereinabove, once the leading edge 15 of the glass sheet 14 engages the cutter wheel 46 the latter will be raised slightly to a position somewhat above that shown in FIG. 1. The slight upward movement of the cutter wheel, as shown by the broken line 13 of FIG. 1, is a result of the hardness of the glass sheet and degree of force applied to the cutter wheel by the spring 34. It will be apparent that the depth of the score, or cut, is slightly less than the preset vertical displacement between the jump-up wheel and the cutter wheel, thus permitting the cutter wheel to be unaffected by limited vertical movement of the jump-up wheel during the cutting process as aforedescribed.

It can, therefore, be seen that the stop screw 30, together with its associated stop nut 32, is effective to adjust the preliminary or initial position of the overall cutting head prior to engagement of the jump-up wheel 52 with the glass sheet 14. Thus, the initial, or rest position of the entire movable portion of the cutting head can be preset by the screw 30. On the other hand, the differential between the jump-up wheel 52 and cutting wheel 46 is preset by means of the stop screw 62 mentioned hereinabove. Finally, the screw 36 is effective to adjust the force exerted upon the cutting wheel 46 by the spring 34, and, therefore, to adjust the depth of the scoring mark made by the cutting wheel 36 as it traverses the glass sheet 14.

In conclusion then, the cutting wheel 46 will be seen to be prepositioned at an optimum cutting height by means of the jump-up wheel 52, and its associated adjusting screw 62. The stop screw 30 being effective to preset these parts for different thicknesses of glass. The cutter wheel 46, and the cutting means generally, indicated at 42, are so mounted as to move both upwardly away from the glass sheet, and toward the right in the direction of glass movement in response to engagement of the jump-up wheel 52 with the glass sheet 14 (thus substantially reducing or eliminating at the instant of engagement the relative rate of linear movement). Not only does the cutting wheel 46 move both upwardly, and in the direction of travel of the glass sheet 14, but it is also noted that the mounting block 28, which supports the cutting means 42 always remains oriented at the same angle with respect to the plane of the glass sheet 14, and the cutting wheel positioned for rotation in a plane perpendicular thereto.

While the parallelogram-type mounting system for the cutting means 42 is an important feature of the present invention, it is also noted that the particular angular position of the levers 24 and 26 also comprises an important facet of the present invention. With the 45° inclination shown, the cutting wheel 46 is caused to move both upwardly and in the direction of glass travel by substantially the same distance due to this 45° angle. While the levers 24 and 26 are preferably disposed at a 45° angle, it has been found that many of the advantages of the present invention can be realized provided only that the levers carrying the mounting block 28 be mounted at an angle in the range between 30° and 60° with respect to the plane of the glass sheet 14.

The invention claimed is:

1. A cutting head for use in a glass cutting apparatus capable of achieving relative translational movement in at least one direction between said head and a glass sheet to be cut, said head comprising a support body adapted for attachment to said apparatus, glass cutting means, a mounting block for said cutting means, at least one lever pivotally connected to said support body for movement about a lever axis fixed in said body, a free end portion of said lever carrying said mounting block, biasing means for urging said mounting block toward said glass sheet, stop means for engaging said lever to hold said lever and mounting block in an inclined position wherein the longitudinal axis of said lever is oriented at an acute angle with respect to said glass sheet, which angles lies in the range between 30° and 60°, and a jump-up wheel rotatably mounted ahead of said cutting means in the direction of glass movement, linkage means carried by said support body and connecting said jump-up wheel to said lever for pivoting said lever and said cutting means away from said glass sheet and rearwardly with respect to the direction of glass movement in response to the movement of the glass sheet past said jump-up wheel.

2. A cutting head for use in a glass cutting apparatus capable of achieving relative translational movement in at least one direction between said head and a glass sheet to be cut, said head comprising a support body adapted for attachment to said apparatus, a cutter wheel, a mounting block in which said cutter wheel is supported for rotation in a plane perpendicular to said glass sheet, at least one pair of levers pivotally connected to said support body for rotation about spaced lever axes fixed in said body, each of said levers having a free end portion which defines a movable pivot axis spaced from its associated lever axis by a like distance, and said mounting block being pivotally carried by said lever free end portions so as to hold said movable pivot axes in the same spaced relation as said spacing between said fixed lever axes so as to restrict said levers to parallel movement only, whereby said mounting block is restricted to arcuate movement and is oriented at a constant angle to the glass sheet during such movement.

3. A cutting head as set forth in claim 2 and further characterized by biasing means for urging said mounting block toward the glass sheet to be cut, and stop means for engaging one of said levers to hold each of said levers in an inclined position wherein the longitudinal axis of each of said levers is oriented at an acute angle with respect to said glass sheet, which angle lies in the range between 30° and 60°.

4. A cutting head as set forth in claim 2 and further characterized by biasing means for urging said block toward said glass sheet, a jump-up wheel mounted ahead of said cutter wheel in the direction of glass movement, and a third lever pivotally supported in said body for rotation about an associated lever axis fixed in said body, a free end portion of said third lever rotatably supporting said jump-up wheel for engagement with a leading edge of the glass sheet to be cut, a link having one end connected to said third lever and an opposite end connected to one of said parallel levers so that said jump-up wheel causes said mounting block to move away from said glass sheet and rearwardly with respect to the direction of glass movement in response to such initial engagement between said jump-up wheel and said glass sheet.

5. A cutting head as set forth in claim 4 wherein said third lever is arranged in generally parallel relationship with said pair of parallel levers, and wherein all of said levers are pivotally supported in said support body for limited pivotal movement about fixed axes which are spaced therealong in the direction of glass movement, and wherein a second pair of parallel levers are coaxially supported opposite said first pair in transversely spaced relationship thereto, said mounting block having a generally rectangular platform and being pivotally connected adjacent its four corners to the four free end portions of said lever pairs for restricting said mounting block to arcuate movement as aforesaid.

6. A cutting head as set forth in claim 5 wherein corresponding levers in each of said pairs comprise yoke portions of bifurcated members, at least one of said members including an upstanding stem portion against which said stop means acts, said stop means comprising an adjustable stop screw threadably received in said support body and having an inner end which engages said stem portion to position both said lever pairs in a predetermined inclined trailing position against the force of said biasing means, said stop means thereby providing a convenient adjustment for presetting the rest position of said jump-up wheel and cutter wheel prior to engagement with the glass sheet.

7. A cutting head as set forth in claim 6 wherein said third lever upon which said jump-up wheel is rotatably supported further includes an upstanding crank arm portion, said link being pivotally connected at one end to said crank arm portion, and means connecting the opposite end of said link to said stem portion of said bifurcated lever defining member, said last-mentioned means being effective to move said parallel levers upon initial engagement between said jump-up wheel and said glass sheet as aforesaid, and said connecting means also serving to provide limited freedom of return movement for said third lever independently of said parallel levers whereby said jump-up wheel can ride freely across the glass surface without interfering with the cutting force between said cutter wheel and said glass sheet during scoring of the latter.

8. A cutting head as set forth in claim 7 wherein said biasing means comprises at least one spring acting between said mounting block and said supporting body.

9. A cutting tool as set forth in claim 8 and further characterized by means for varying the force exerted by said spring, said spring comprising a coiled torsion spring having radially outwardly projecting end portions one of which engages an abutment surface on said mounting block, and said means for varying said torsion spring force comprising a screw threadably received in said support body and having an inner end connected to said other projecting spring end portion whereby the angular displacement between said end portions can be varied in response to rotation of said screw to vary the force exerted on said mounting block.

References Cited

UNITED STATES PATENTS 1,972,210  9/1934  Waldron _____ 225—965
2,239,454  4/1941  Carlson _____ 83—12
3,280,676  10/1966  Grzymislanwski ____ 83—12 X

FOREIGN PATENTS 1,159,141  12/1963  Germany.

WILLIAM S. LAWSON, *Primary Examiner.*